US009856154B2

(12) United States Patent
Horikawa et al.

(10) Patent No.: US 9,856,154 B2
(45) Date of Patent: Jan. 2, 2018

(54) FRESH WATER GENERATION METHOD

(71) Applicant: TORAY INDUSTRIES, INC., Tokyo (JP)

(72) Inventors: Gentaro Horikawa, Ehime (JP); Hiroaki Kubo, Ehime (JP); Koji Fujiwara, Ehime (JP)

(73) Assignee: Toray Industries, Inc., Tokyo (JP)

( * ) Notice: Subject to any disclaimer, the term of this patent is extended or adjusted under 35 U.S.C. 154(b) by 589 days.

(21) Appl. No.: 14/388,133

(22) PCT Filed: Mar. 26, 2013

(86) PCT No.: PCT/JP2013/058787
§ 371 (c)(1),
(2) Date: Sep. 25, 2014

(87) PCT Pub. No.: WO2013/146784
PCT Pub. Date: Oct. 3, 2013

(65) Prior Publication Data
US 2015/0321928 A1 Nov. 12, 2015

(30) Foreign Application Priority Data

Mar. 27, 2012 (JP) .................................. 2012-071574

(51) Int. Cl.
*B01D 61/12* (2006.01)
*C02F 1/44* (2006.01)
(Continued)

(52) U.S. Cl.
CPC ............ *C02F 1/441* (2013.01); *B01D 61/025* (2013.01); *B01D 61/027* (2013.01); *B01D 61/12* (2013.01);
(Continued)

(58) Field of Classification Search
CPC .......... C02F 1/441; C02F 1/008; C02F 1/442; C02F 2209/40; C02F 2103/04;
(Continued)

(56) References Cited

U.S. PATENT DOCUMENTS 4,234,419 A * 11/1980 Coillet .................. B01J 39/04
210/664
4,498,982 A * 2/1985 Skinner .................. B01D 61/08
210/186

(Continued)

FOREIGN PATENT DOCUMENTS

JP 9-299944 A 11/1997
JP 2001-252659 A 9/2001
(Continued)

OTHER PUBLICATIONS

International Search Report for International Application No. PCT/JP2013/058787 dated May 28, 2013.

*Primary Examiner* — David C Mellon
(74) *Attorney, Agent, or Firm* — RatnerPrestia

(57) ABSTRACT

The present invention relates to a fresh water generation method using a water treatment apparatus, the method including feeding water to be treated into a membrane element including a reverse osmosis membrane or a nanofiltration membrane to separate into concentrate and permeate, in which the method includes, under operation of the apparatus, adjusting a concentrate flow rate and/or a permeate flow rate based on a water quality index of the water to be treated and a water quality index of combined water prepared by combining the concentrate and the permeate at a ratio based on a predetermined permeate recovery rate, so that the water quality index of the water to be treated falls within a tolerance on the water quality index of the combined water.

2 Claims, 3 Drawing Sheets

(51) Int. Cl.
*B01D 61/02* (2006.01)
*C02F 1/00* (2006.01)
*C02F 103/04* (2006.01)
*C02F 103/08* (2006.01)

(52) U.S. Cl.
CPC .............. *C02F 1/008* (2013.01); *C02F 1/442* (2013.01); *B01D 2311/16* (2013.01); *B01D 2311/243* (2013.01); *C02F 2103/04* (2013.01); *C02F 2103/08* (2013.01); *C02F 2209/20* (2013.01); *C02F 2209/40* (2013.01)

(58) Field of Classification Search
CPC .............. C02F 2103/08; C02F 2209/20; B01D 61/025; B01D 61/027; B01D 61/12; B01D 2311/16; B01D 2311/243
See application file for complete search history.

(56) References Cited

U.S. PATENT DOCUMENTS

| | | | | |
|---|---|---|---|---|
| 4,629,568 A * | 12/1986 | Ellis, III | ................ | B01D 61/08 210/136 |
| 4,772,385 A * | 9/1988 | Yamada | ................ | B01D 61/12 210/103 |
| 5,520,816 A * | 5/1996 | Kuepper | ............. | B01D 61/025 210/137 |
| 5,647,973 A * | 7/1997 | Desaulniers | ........... | B01D 61/12 210/195.2 |
| 5,685,990 A * | 11/1997 | Saugmann | ........... | A23C 9/1422 210/195.2 |
| 5,779,911 A * | 7/1998 | Haug | ................ | B01D 61/12 210/143 |
| 5,858,240 A * | 1/1999 | Twardowski | ........ | B01D 61/022 210/639 |
| 6,190,558 B1 * | 2/2001 | Robbins | ............... | B01D 61/025 210/134 |
| 6,556,930 B1 * | 4/2003 | Lueck | ................ | B01D 61/12 210/614 |
| 6,560,543 B2 * | 5/2003 | Wolfe | ................ | B01D 61/12 210/141 |
| 6,609,070 B1 * | 8/2003 | Lueck | ................ | B01D 61/12 210/614 |
| 9,314,742 B2 * | 4/2016 | Goodfellow | ......... | B01D 61/022 |
| 2003/0075506 A1 * | 4/2003 | Tudhope | ................ | B01D 15/00 210/644 |
| 2004/0222158 A1 * | 11/2004 | Husain | ................ | B01D 61/04 210/651 |
| 2006/0138031 A1 * | 6/2006 | Kloos | ................ | B01D 61/022 210/96.2 |
| 2007/0119782 A1 * | 5/2007 | Rawson | ............... | B01D 61/025 210/650 |
| 2008/0230476 A1 * | 9/2008 | Gilron | ................ | B01D 61/02 210/652 |
| 2011/0315632 A1 * | 12/2011 | Freije, III | .............. | B01D 61/12 210/636 |

FOREIGN PATENT DOCUMENTS

| | | |
|---|---|---|
| JP | 2006-305499 A | 11/2006 |
| JP | 2007-125493 A | 5/2007 |
| JP | 2009-285522 A | 12/2009 |
| JP | 2010-46668 A | 3/2010 |

* cited by examiner

FRESH WATER GENERATION METHOD

CROSS REFERENCE TO RELATED APPLICATIONS

This is the U.S. National Phase application of PCT/JP2013/058787, filed Mar. 26, 2013, which claims priority to Japanese Patent Application No. 2012-071574, filed Mar. 27, 2012, the disclosures of each of these applications being incorporated herein by reference in their entireties for all purposes.

FIELD OF THE INVENTION

The present invention relates to a water treatment apparatus using a semipermeable membrane element, and further relates to a recovery rate adjustment method which makes it possible to avoid factors causing degradation in semipermeable membrane quality, such as development of scales, thereby allowing operations of the apparatus at a predetermined recovery rate.

BACKGROUND OF THE INVENTION

Because of their capabilities for efficient removal of charged substances or uncharged ones, semipermeable membranes have been utilized in wide-ranging areas, including substances of desalination of seawater and brackish water, production of pure water and ultrapure water for medical and industrial uses, wastewater treatment and food industries. In separation treatment using the semipermeable membranes, a membrane element using a semipermeable membrane has been generally adopted.

FIG. 1 is a schematic cross-sectional view showing one embodiment of a membrane separation system using semipermeable membrane elements. A plurality of semipermeable membrane elements 1 are loaded in series in a pressure vessel 2, and water to be treated (raw water) is fed into the pressure vessel 2 in a state of being pressurized by a pump 3 and separated into concentrate and permeate.

The water quality of permeate obtained in such a membrane separation system is generally affected by concentrations of impurities contained in raw water. In addition, with regard to some of the impurities, when they are excessively concentrated in the vicinity of the surfaces of semipermeable membrane, a phenomenon like fouling or scaling is caused to result in clogging of the semipermeable membranes. The term "fouling" as used herein refers to the phenomenon in which suspended substances, colloidal substances, organic substances and the like in water are deposited or adsorbed on membrane surfaces, and the term "scaling" as used herein refers to the phenomenon in which dissolved salts in water are precipitated out and deposited on membrane surfaces when the water is concentrated to an extent beyond solubility limits of the dissolved salts.

When concentration degrees of impurities become high in the vicinity of the surfaces of semipermeable membranes, there occur increases in amounts of impurities leaked into permeate, thereby causing a problem that the permeate suffers deterioration in water quality. In the membrane separation system, it therefore becomes necessary to maintain the removal ratio of impurities within a predetermined range and suppress deterioration in water quality of permeate by operating the system so as not to cause concentration to a higher degree than necessary in the vicinity of the surfaces of semipermeable membranes. In addition, when there occurs a clogging of semipermeable membranes in the semipermeable membrane elements, permeation flux of water is reduced, and a flow rate of permeate is lowered. In the membrane separation system, there is therefore a necessity not only to maintain the removal ratio of impurities within a predetermined range and suppress the deterioration in water quality of permeate by operating the system so as not to cause concentration to a higher degree than necessary in the vicinity of surfaces of semipermeable membranes, but also to control a decrease in flow rate of permeate through the prevention of fouling and scaling. Further, with the flow rate of permeate usually kept constant by varying a pressure (operation pressure) for pressurization of the water to be treated during the operation of the membrane separation system, the excessive concentration occurring in the vicinity of semipermeable membrane surfaces causes increase of impurity concentrations in the vicinity of the semipermeable membrane surfaces to result in a rise of osmosis pressure, whereby the operation pressure is heightened and energy loss is caused. Thus it is necessary in the membrane separation system to perform efficient operations by operating the system so as not to cause concentration to a higher degree than necessity in the vicinity of the surfaces of semipermeable membranes.

As a control index to prevention of excessive concentration during operations of the membrane separation system, a recovery rate is adopted. The term "recovery rate" as used herein means that, in a case e.g. shown in FIG. 2 where the flow rate of water to be treated in a membrane filtration section 4 provided with a semipermeable membrane element is 100 L/min and the flow rate of permeate is 20 L/min, the recovery rate is calculated from the proportion of the flow rate of permeate to the flow rate of water to be treated, and it becomes 20÷100×100=20%. Additionally, the flow rate of water to be treated in the membrane separation system is the sum of the flow rate of concentrate and the flow rate of permeate, and the recovery rate is generally adjusted by measuring the flow rate of concentrate and the flow rate of permeate with a concentrate flow meter 5 and a permeate flow meter 6, respectively, and by manipulating valves for control of their respective flow rates.

In a case where the recovery rate is a high value, it is thought that excessive concentration occurs in the vicinity of the surface of the semipermeable membrane and, as mentioned above, there are possibilities of causing deterioration in water quality of permeate of the semipermeable membrane, lowering the flow rate of permeate and occurring an energy loss. On the other hand, in a case where the recovery rate is a low value, there arises a problem that the ratio of the flow rate of concentrate to the flow rate of raw water becomes high; as a result, the concentrate is discharged to excess, and it becomes difficult to aim at effective use of water.

It is therefore necessary to carry out operations free from such excessive concentration and excessive discharge of concentrate as mentioned above by setting an ideal recovery rate according to preconditions including the kind of water to be treated, the quality of water to be treated, water temperature and so on and operating the membrane separation system so as to achieve the ideal recovery rate.

As a membrane filtration method capable of maintaining both the flow rate of permeate and the water quality of permeate, for example, there has been known the method disclosed in Patent Document 1. In the Patent Document 1, it has been suggested that the amount of concentrate to be discharged should be adjusted according to either the water temperature of any of water to be treated, permeate and concentrate or the quality of water to be treated, and besides, the amount of concentrate to be discharged should be adjusted based on the condition of deterioration in water quality of permeate, and the clogging and wearing conditions of a filtration membrane.

PATENT DOCUMENT

Patent Document 1: JP-A-2006-305499

SUMMARY OF THE INVENTION

As mentioned above, flow meters are generally used in adjusting the recovery rate. In a practical membrane separation system, it is not infrequent that errors arise in flow meters. In the case of using large flow meters in particular, there is a high possibility of causing errors because of difficulty in checking such meters. For example, in a case where the membrane separation system is operated on a precondition that the recovery rate under operation is adjusted, as shown in FIG. 3, to 45% of a predetermined recovery rate by controlling the flow rates of concentrate and permeate from the membrane separation system to 55 L/min with a concentrate flow meter and to 45 L/min with a permeate flow meter, respectively, even if the concentrate flow meter gives a readout of 55 L/min because of errors caused therein, so long as the actual flow rate of concentrate is e.g. 50 L/min, the actual recovery rate under operation is supposed to be 47.4%, which is higher than the predetermined recovery rate. The case in which an error has occurred in the flow meter as mentioned above brings about a situation that the membrane separation system comes to be not operated at the predetermined recovery rate, whereby problems may become evident after deterioration in water quality of permeate and decrease in flow rate of permeate have been caused by excessive concentration, and cases may occur where nobody notices that the energy loss has come to be greater than required with increase in the osmosis pressure and that the amount of concentrate discharged has increased to excess.

The method disclosed in Patent Document 1 cannot, however, cope with cases where errors have occurred in flow meters, and has the possibility of causing excessive concentration and excessive discharge of concentrate. In addition, increasing the amount of discharged concentrate with reference to deterioration in water quality of permeate and clogging and wearing conditions of a filtrate membrane causes the possibility of leading to discharge of concentrate at an excessive flow rate.

The invention therefore aims to efficiently operate a water treatment apparatus using a semipermeable membrane element without energy loss on condition that, even when errors arise in flow meters, operations are performed at a predetermined recovery rate by eliminating factors causing the errors, thereby avoiding deterioration in water quality of permeate and decrease in flow rate of permeate from occurring due to excessive concentration, preventing discharge of concentrate in an amount greater than necessary and aiming at water conservation while using the water treatment apparatus with stability over an extended period of time.

In order to solve such problems as described above, the invention includes the following aspects.

(1) A fresh water generation method using a water treatment apparatus, the method including feeding water to be treated into a membrane element including a reverse osmosis membrane or a nanofiltration membrane to separate into concentrate and permeate, in which the method includes, under operation of the apparatus, adjusting a concentrate flow rate and/or a permeate flow rate based on a water quality index of the water to be treated and a water quality index of combined water prepared by combining the concentrate and the permeate at a ratio based on a predetermined permeate recovery rate, so that the water quality index of the water to be treated falls within a tolerance on the water quality index of the combined water.

(2) The fresh water generation method according to (1), in which the water quality index is an electrical conductivity.

(3) The fresh water generation method according to (1) or (2), in which, when the water quality index of the combined water exceeds the tolerance on the water quality index of the water to be treated, an alarm is sounded or the operation of the water treatment apparatus is stopped.

According to the method for fresh water generation of the present invention, in a water treatment apparatus using a semipermeable membrane element, factors causing errors arising in flow meters are eliminated, whereby operations at a predetermined recovery rate become possible to result in allowing avoidance of water quality deterioration and flow rate decrease of permeate caused by excessive concentration and prevention of discharge of concentrate in an amount greater than necessary.

DETAILED DESCRIPTION OF EMBODIMENTS OF THE INVENTION

Modes for carrying out the invention will now be described by reference to the drawings. The invention should not, however, be construed as being limited to the embodiments illustrated in these drawings.

The method for fresh water generation of the present invention is carried out in a water treatment apparatus configured so that water to be treated is fed into a membrane element including a reverse osmosis membrane or a nanofiltration membrane (hereinafter referred to as a semipermeable membrane), and separated into permeate and concentrate.

The reverse osmosis membrane (RO membrane) is a separation membrane capable of filtering out substances having molecular weight of about several tens. On the other hand, the nanofiltration membrane (NF membrane) is a separation membrane which can inhibit fine particles about 2 nm in size and polymers from permeating through it and stands midway between an ultrafiltration membrane (UF membrane: 0.01 to 0.001 μm in membrane pore size) and a reverse osmosis membrane in filtration function.

As materials for a semipermeable membrane relating to the invention, polymeric materials, such as acetylcellulose polymers, polyamide, polyester, polyimide and vinyl polymers, can be used. With regard to the structure thereof, the semipermeable membrane may be an asymmetric membrane of such a structure as to have a dense layer on at least one side and fine pores gradually increasing in size in the direction from the dense layer to the inside or the other side of the membrane, or it may also be a composite semipermeable membrane including a very thin separation function layer which is made from a material different from that of the dense layer and is formed on the dense layer of the asymmetric membrane. Of these, however, preferred one is a composite semipermeable membrane which includes polyamide as a separation function layer and which has excellent performances such as a high pressure resistance, high permeability and a high solute removing performance.

Figure 1:
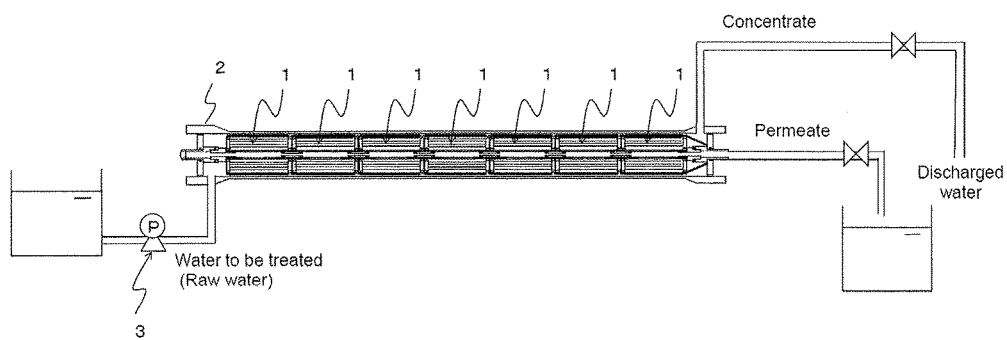
FIG. 1 is a schematic view showing one example of a water treatment apparatus using semipermeable membrane elements.
Figure 2:
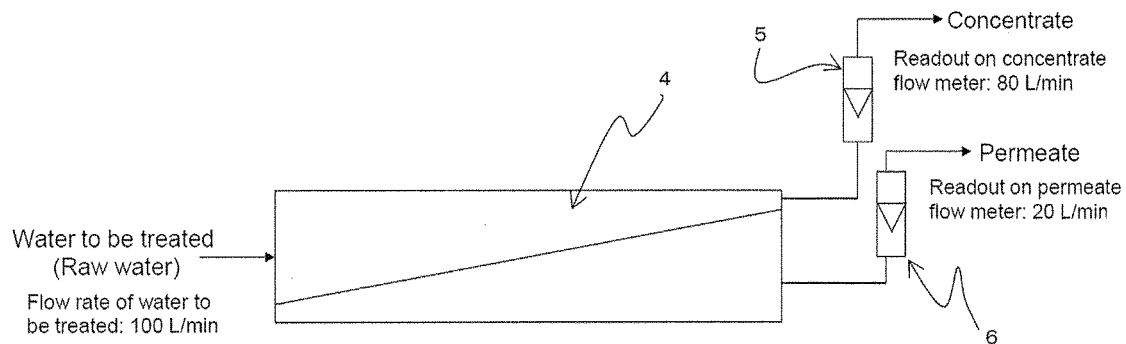
FIG. 2 is a view explaining a method for calculating the recovery rate in a water treatment apparatus using a semipermeable membrane element.
Figure 3:
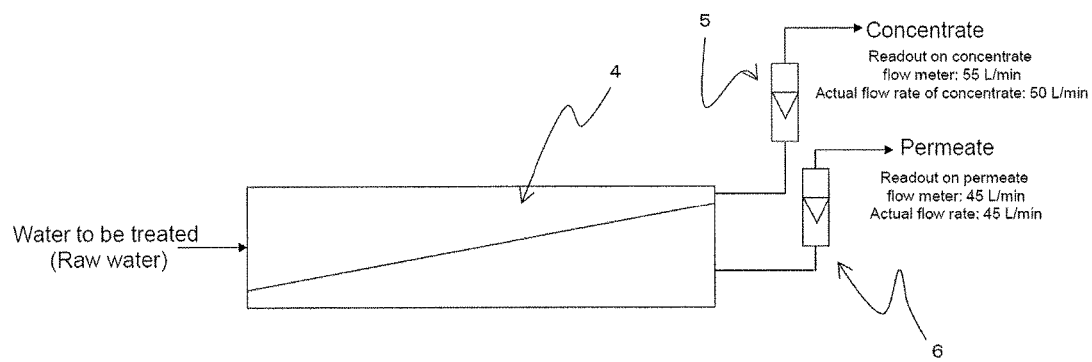
FIG. 3 is a view explaining a change in the recovery rate by occurrence of errors in a flow meter in a water treatment apparatus using a semipermeable membrane element.
Figure 4:
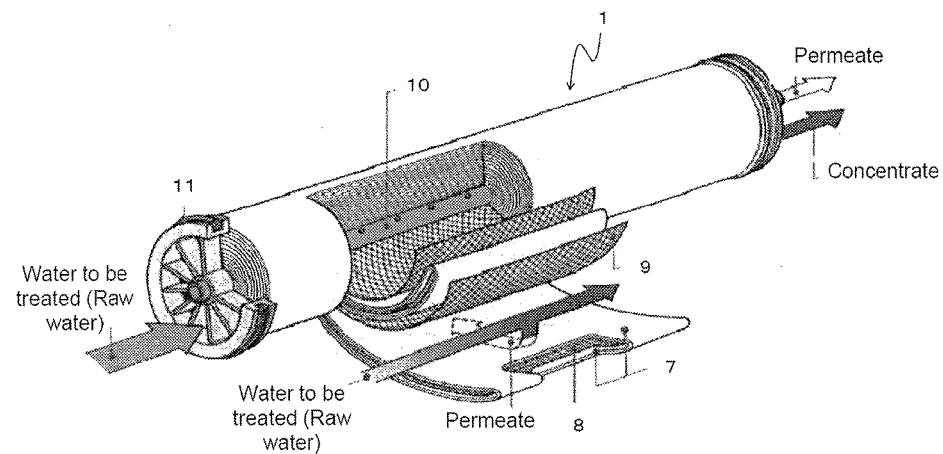
FIG. 4 is a schematic structural view of a spiral-type membrane element.

The membrane element according to the present invention has no particular restrictions as to the form thereof, but it is preferable to adopt a spiral-type membrane element having the structure shown in FIG. 4. The structure of a spiral-type membrane element is a structure such that an envelope-like semipermeable membrane 7 in which a permeate spacer 10 is involved is spirally wound around a central pipe 10 via a raw water spacer 9. In practice the spiral-type membrane element is provided with a brine seal 11 at one end thereof, and housed in a pressure vessel of the water treatment apparatus. Then water to be treated is pressurized by means of a pump, fed into the pressure vessel, and separated into permeate and concentrate. The permeate is made to pass through the inside of the envelope-like semipermeable membrane 7, and taken out via the central pipe 10. The concentrate is made to pass through the raw water spacer 9 (mesh spacer), and discharged to the outside of the pressure vessel.

In the present invention, a water treatment apparatus can be operated at a recovery rate (permeate recovery rate) determined under elimination of influences of errors in a flow meter by monitoring, during the operations, both the water quality index of water to be treated and the water quality index of combined water prepared by combining concentrate and permeate at a ratio based on a predetermined recovery rate of the permeate and by adjusting the concentrate flow rate and/or the permeate flow rate so as to equalize the water quality index of the combined water with the water quality index of the water to be treated when the water quality index of the combined water exceeds the tolerance on the water quality index of the water to be treated. Herein, the same water quality index is applied to the water to be treated and the combined water between which a comparison is made. By having such a feature, the present invention allows operations at a correct recovery rate by adopting a measurable water quality index, thereby eliminating influences of errors in a flow meter even in a water treatment apparatus provided with a hard-to-check large flow meter. Thus the present invention can avoid the water quality of permeate from deteriorating and the flow rate of permeate from decreasing due to excessive concentration, and further can reduce needless discharge of concentrate and aim for efficient use of water.

The water quality index as used herein is not particularly restricted so long as the water quality adopted as an index thereof can be measured during operations and the index allows numerical comparison between water qualities of water to be treated and concentrate-permeate combined water. For example, the index may be TOC (Total Organic Carbon), UV or SDI (Silt Density Index). It is, however, preferable to choose an index which makes it possible to simply get measured values, because sometimes it is required to repeat recovery rate adjustment work conducted through the comparison between water qualities of water to be treated and combined water obtained during operations of a water treatment apparatus.

Further, in the following explanation of the invention, electrical conductivity is adopted as an example of the water quality index because measurement thereon can be made with particular ease. Additionally, electrical conductivity measurements are made on water to be treated and combined water by means of an electrical conductivity meter conforming to JIS K 0130 (2008). And the monitoring in the present invention includes measuring electrical conductivity with an automatic and/or hand-operated instrument.

Figure 5:
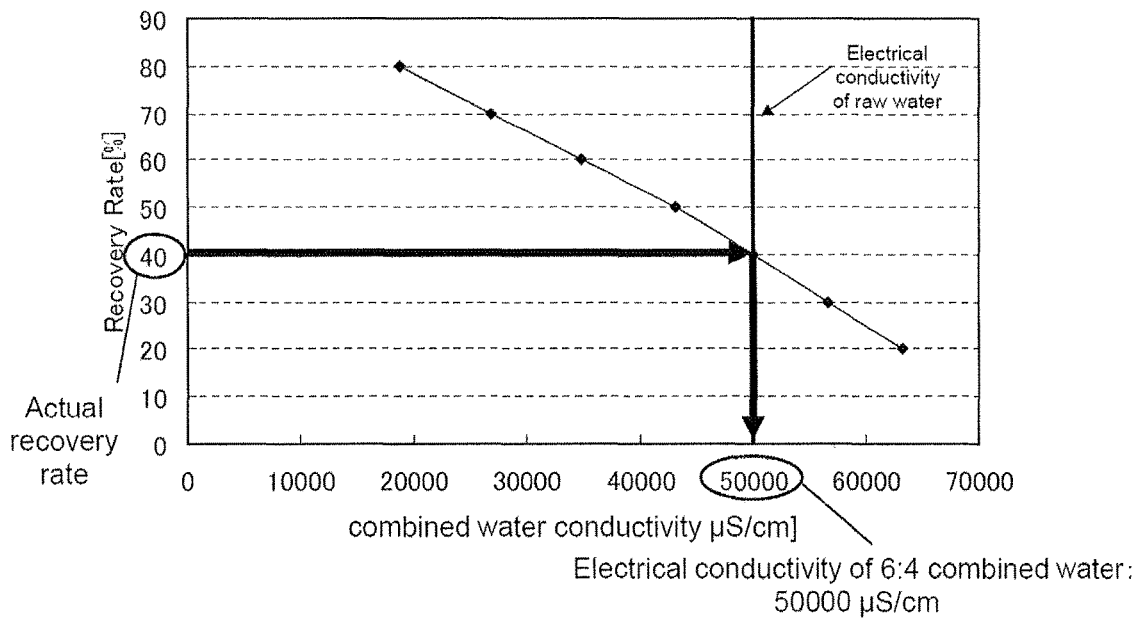
FIG. 5 is one example of a correlation graph showing a correlation between an electrical conductivity of concentrate-permeate combined water and that of water to be treated in the present invention.

As shown e.g. in FIG. 5, in order to attain a recovery rate of 40% under operation conducted in a water treatment apparatus on a preposition that the predetermined recovery rate is 40%, the concentrate flow rate is adjusted so that a concentrate flow meter gives a readout of 60 L/min and the permeate flow rate is adjusted so that a permeate flow meter gives a readout of 40 L/min. At this time, the flow rate of water to be treated is 100 L/min because it is the sum of the concentrate flow rate and the permeate flow rate. Further, in a case where the electrical conductivity of the water to be treated is 50,000 μS/cm at that time, as long as the electrical conductivity of combined water prepared by combining permeate and concentrate at a ratio of 4:6 based on the predetermined recovery rate of 40% is also 50,000 μS/cm, no errors arise in the flow meters because the electrical conductivity of the water to be treated is equal to the electrical conductivity of the combined water, and this situation indicates that the water treatment apparatus is practically being operated at the same recovery rate as the predetermined recovery rate.

Figure 6:
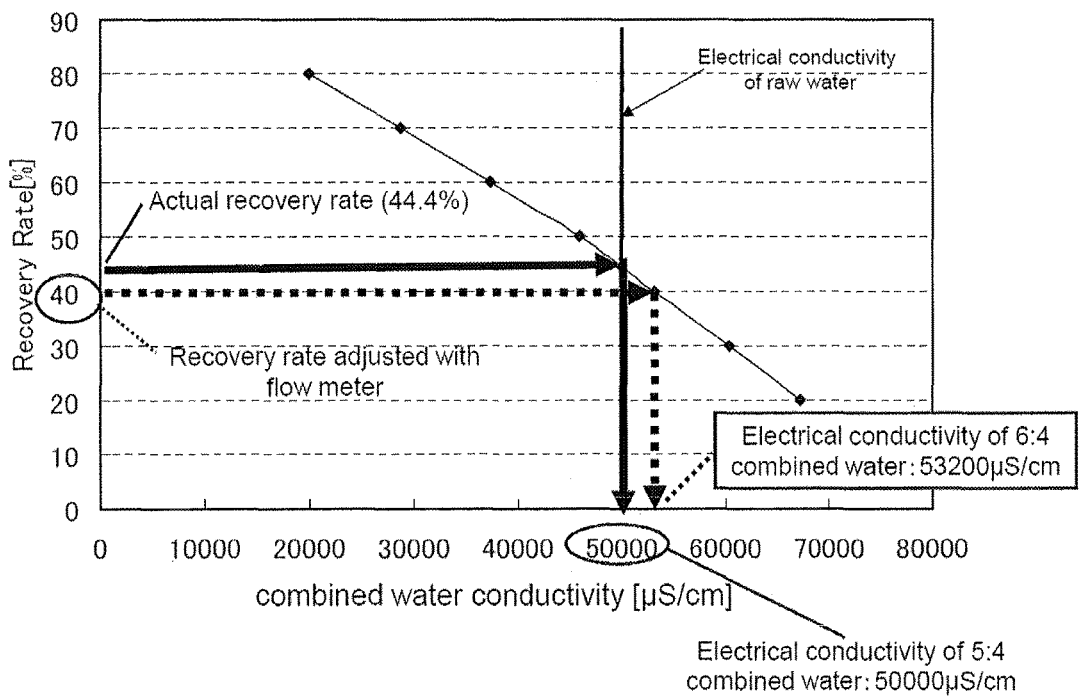
FIG. 6 is one example of a correlation graph showing an influence of errors having arisen in a flow meter on a correlation between the electrical conductivity of concentrate-permeate combined water and that of water to be treated in the present invention.

Next, as shown in FIG. 6, in order to attain a recovery rate of 40% under operation conducted in the water treatment apparatus on the preposition that the predetermined recovery rate is 40%, the concentrate flow rate is adjusted so that a concentrate flow meter gives a readout of 60 L/min and the permeate flow rate is adjusted so that a permeate flow meter gives a readout of 40 L/min. Herein, an assumption is, however, made that an error has arisen in the concentrate flow meter, and the actual concentrate flow rate is lower than the readout (60 L/min) on the concentrate flow meter and the apparatus is being operated at the actual concentrate flow rate of 50 L/min.

In such a case, though the water treatment apparatus is assumed to be correctly operated at the predetermined recovery rate because the flow rate of the water to be treated is 100 L/min as calculated based on the readout on the flow meter and the recovery rate under operation is 40% as calculated based on the readouts on the flow meters, the actual flow rate of the water to be treated in the water treatment apparatus is 90 L/min and the water treatment apparatus is actually being operated at a recovery rate of 44.4% which is higher than the predetermined recovery rate.

The electrical conductivity of the water to be treated in such a case is 50,000 μS/cm, and when the assumption is made that the tolerance is 500 μS/cm, the electrical conductivity of combined water prepared by combining concentrate and permeate at a ratio of 6:4 based on the predetermined recovery rate of 40% is found to be 53,200 μS/cm, and this value exceeds the tolerance on the electrical conductivity of the water to be treated, 50,000 μS/cm. Therefore, even though operations have been conducted with the intention of adjusting the recovery rate to become 40%, the electrical conductivity measurements reveal that, in actual fact, operations have been conducted at a higher recovery rate. The actual recovery rate under operation is therefore lowered by manipulating valves so as to increase the concentrate flow rate and/or decrease the permeate flow rate. Thereafter, the electrical conductivity of combined water prepared again at a combining ratio of 6:4 is monitored, and the manipulations similar to the above are repeated until the electrical conductivity of the combined water comes to fall within the tolerance on the electrical conductivity of the water to be treated. Thus it becomes possible to avoid deterioration in water quality of permeate and reduction in permeate flow rate from occurring due to excessive concentration. On the other hand, in a case opposite to the above in which the electrical conductivity of combined water is lower than that of water to be treated, operations have been conducted at a recovery rate lower than the predetermined recovery rate, and valve manipulations to decrease a concentrate flow rate and/or increase a permeate flow rate are repeated until the electrical conductivity of the combined water comes to fall within the tolerance on the electrical conductivity of the water to be treated, whereby needless excessive discharge can be avoided and water conservation can be achieved.

In the manner mentioned above, the electrical conductivity of combined water prepared by combining concentrate and permeate at a ratio based on the predetermined recovery rate of permeate is put in contrast with the electrical conductivity of water to be treated and, when it is detected that the electrical conductivity of the combined water has differed from that of the water to be treated to such an extent as to exceed the tolerance, control operations of the concentrate flow rate and/or the permeate flow rate are repeated, whereby it becomes possible to eliminate influences of errors in flow meters and carry out operations at the same recovery rate as the predetermined one even when the flow meters are hard-to-check large flow meters.

On the other hand, in a case where operations are continued at a recovery rate higher than a predetermined recovery rate, excessive concentration occurs in the vicinity of a semipermeable membrane, thereby increasing an amount of impurity leakage into permeate and causing not only deterioration in water quality of the permeate but also fouling and scaling to result in reduction in permeate flow rate. Thus the life span of a semipermeable membrane element is shortened significantly. Therefore, in the present invention, it is possible to cause the water treatment apparatus to stop by sounding an alarm or actuating interlock at a time when the electrical conductivity of combined water increases beyond the tolerance on the electrical conductivity of water to be treated, whereby factors causing degradation in performance of a semipermeable membrane element can be avoided at an early stage and stable operations of water treatment apparatus can be achieved over a prolonged time period.

The invention has been described above in detail and with reference to the specified embodiments. It will, however, be apparent to one skilled in the art that various changes and modifications can be made without departing from the spirit and scope of the invention.

The present application is based on Japanese Patent Application No. 2012-071574 filed on Mar. 27, 2012, the contents of which are incorporated herein by reference.

The method for recovery rate adjustment of the present invention can be applied to various water treatment apparatuses using a semipermeable membrane.

DESCRIPTION OF REFERENCE NUMERALS AND SIGNS

1 Semipermeable membrane element
2 Pressure vessel
3 Pump
4 Membrane filtration section
5 Concentrate flow meter
6 Permeate flow meter
7 Semipermeable membrane
8 Permeate spacer
9 Raw water spacer
10 Central pipe
11 Brine seal

The invention claimed is:

1. A fresh water generation method using a water treatment apparatus, the method comprising feeding water to be treated into a membrane element comprising a reverse osmosis membrane or a nanofiltration membrane to separate into concentrate and permeate,
    wherein the method comprises, under operation of the water treatment apparatus, adjusting a concentrate flow rate and/or a permeate flow rate based on a water quality index of the water to be treated and a water quality index of combined water prepared by combining the concentrate and the permeate at a ratio based on a predetermined permeate recovery rate, so that the water quality index of the water to be treated falls within a tolerance on the water quality index of the combined water, wherein the water quality index of the water to be treated and the water quality index of combined water are an electrical conductivity.

2. The fresh water generation method according to claim 1, wherein, when the water quality index of the combined water exceeds the tolerance on the water quality index of the water to be treated, an alarm is sounded or the operation of the water treatment apparatus is stopped.

* * * * *